July 25, 1933.   E. C. RICHARDSON   1,919,747
APPARATUS FOR FESTOONING CLOTH
Filed Oct. 14, 1931   2 Sheets-Sheet 2

INVENTOR.
Edgar C. Richardson
BY
J. M. Castle Jr.
ATTORNEY.

Patented July 25, 1933

1,919,747

UNITED STATES PATENT OFFICE

EDGAR C. RICHARDSON, OF FAIRFIELD, CONNECTICUT, ASSIGNOR TO E. I. DU PONT DE NEMOURS & COMPANY, OF WILMINGTON, DELAWARE, A CORPORATION OF DELAWARE

APPARATUS FOR FESTOONING CLOTH

Application filed October 14, 1931. Serial No. 568,692.

This invention relates to an apparatus for festooning coated cloth and conveying the festooned cloth through a drying chamber and, more particularly, to such an apparatus adapted to continuously and automatically form festoons of cloth.

Heretofore, in apparatuses for this purpose it had been the practice to form festoons of coated cloth by feeding the cloth downwardly across a bar carried in an upward direction by an inclined moving chain, then when a festoon of the desired size was formed the bar was transferred to a horizontal moving chain which carried the festooned cloth through a drying chamber. This apparatus required a man to place bars on the inclined moving chain and two more men to grasp the edges of the cloth formed in a festoon as the bar supporting the festoon was transferred to the horizontal chain in order that the festoon would not lose its form by having the cloth slip, and also to prevent the coated surfaces of the cloth from contacting and sticking together. Obviously, such an apparatus left room for improvement, inasmuch as it kept three men continuously employed, and furthermore occasionally allowed the freshly coated surfaces of the cloth to contact with each other and thereby necessitating stopping the apparatus and disengaging the contacting surfaces of the cloth.

An object of the present invention is to provide an apparatus for festooning cloth and conveying it through a drying chamber that will be entirely automatic and eliminate any danger of the freshly coated surfaces of the cloth engaging each other. Other objects of the invention will be apparent from the description given hereinafter.

The above objects are accomplished according to the present invention by an apparatus for festooning cloth which comprises the combination of a continuous conveyor belt adapted to travel substantially horizontally through a part of its course, said conveyor belt consisting of a pair of spaced parallel flexible elements and spaced cross bars connecting said flexible elements, a feed plate pivoted at its upper end above said conveyor belt at a point where the travel of said belt is substantially horizontal, the position of the feed plate with respect to the conveyor belt being such that the cross bars of the conveyor belt on passing under the feed plate engage same for a short period and swing the feed plate from a perpendicular position upward through a small arc in the direction of travel of the conveyor belt, and means for continuously feeding a web of cloth down over the feed plate and between adjacent cross bars on the conveyor belt to form a festoon while the rearward one of a pair of adjacent cross bars is in engagement with the feed plate, thereby preventing contact of the cloth with said rearward cross bar during formation of the festoon. Ordinarily, such apparatus is disposed in a drying chamber since it is usually the practice to carry out the drying of coated cloth at an elevated temperature, and furthermore, it is frequently desirable to recover solvents volatilized during the drying of the coating.

Referring to the drawings.

Figure 1:
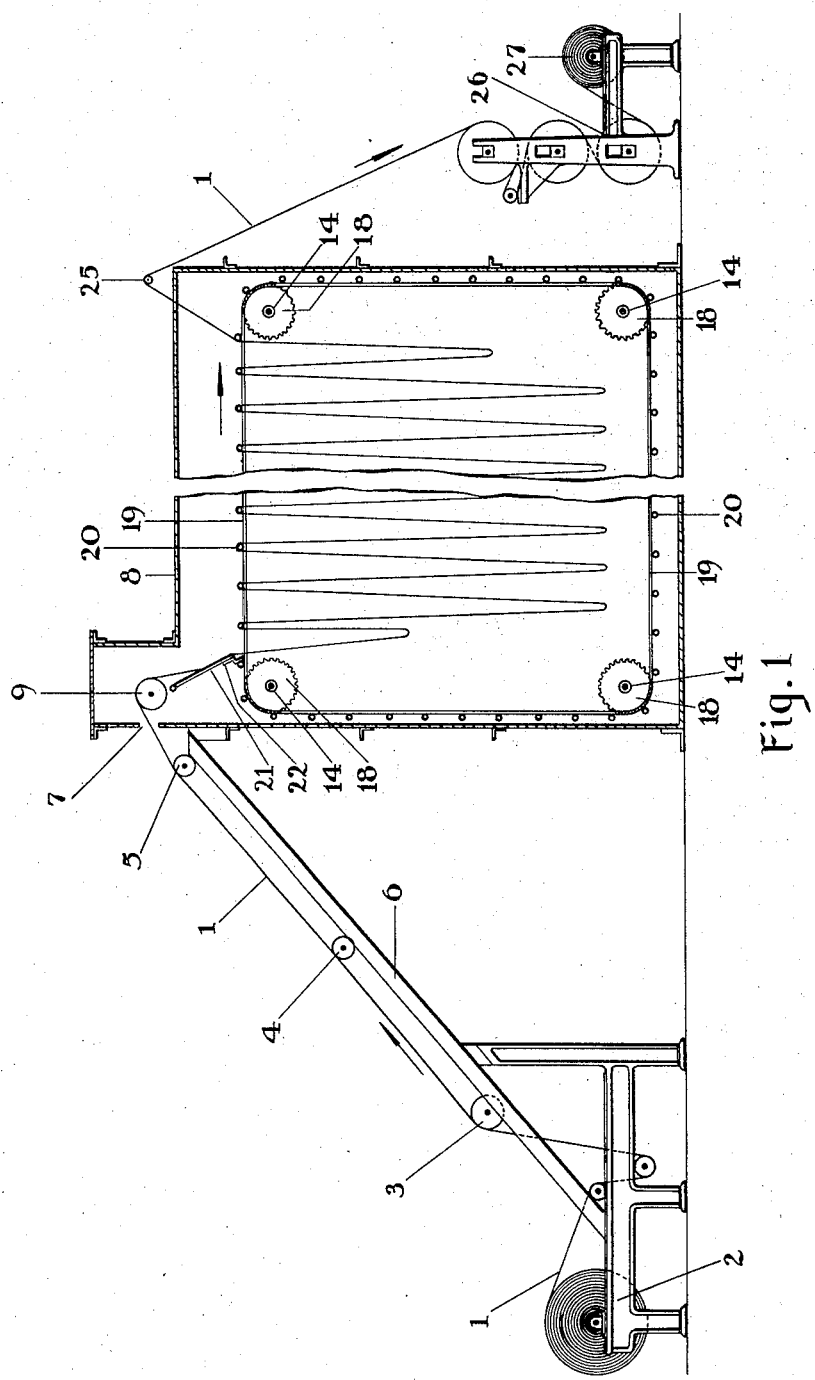
Fig. 1 is a side elevation of an apparatus embodying the present invention in association with a conventional varnishing machine, the drying chamber being shown in section.

Referring more particularly to Fig. 1, the roll of cloth 1 is rotatably mounted in the framework 2 of the varnishing machine, which may be of any conventional design, and forms no part of the present invention. The web of cloth 1 is led through the varnishing machine where a coat of varnish, or the like, is applied, and over the card roll 3 which is the main drive roll, and guide rolls 4 and 5, carried by the inclined framework 6, through the slot 7 in the drying chamber 8 and over a second card roll 9, mounted in the upper part of the drying chamber 8, which card roll 9 continues the pull on the web of cloth 1.

Four shafts 14 are rotatably mounted within the chamber 8, and carry gear wheels 18, only one of each pair of gear wheels being shown in the drawings. The gear wheels 18 carry a conveyor belt comprising a pair of spaced continuous chains 19 connected by spaced cross bars 20. As shown in Fig. 1, the gear wheels 18 are so disposed that the conveyor belt travels substantially horizontally adjacent the top of the drying chamber 8. The conveyor belt is driven by means of one or more of the pairs of gear wheels 18 in the direction of the arrow in Fig. 1.

Figure 2:
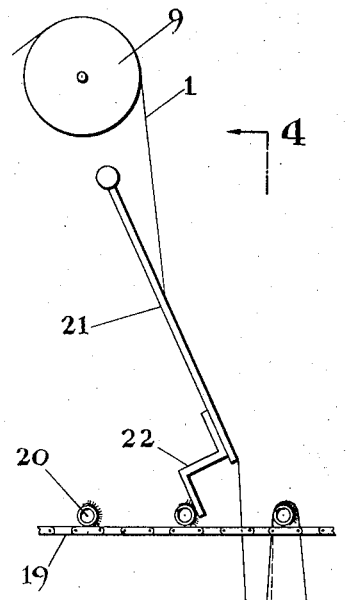
Fig. 2 is an enlarged side elevation of the feed plate and associated structure shown in Fig. 1.

A feed plate 21 is pivotally mounted in the drying chamber 8 at its upper edge beneath the card roll 9, the axis of the card roll 9, the axis of the pivot of the feed plate 21, and the cross bars 20 of the conveyor belt being parallel, as illustrated in Figs. 1 and 2. The width of the feed plate 21 is approximately equal to the width of the conveyor belt (see Fig. 4) and is of such length that in vertical position it clears the cross bars 20 of the conveyor belt beneath. At each side on the back of the feed plate 21 adjacent its lower edge are mounted toes 22 extending slightly below the lower edge of the feed plate 21. The length of the toes is such that they will extend below the cross bars 20 directly under the feed plate 21 when in vertical position, but will ride up over the bars 20 as they move along their horizontal path in the direction of the arrow in Fig. 1.

As shown in Fig. 1, the coated cloth 1 is fed by card roll 9 down over the feed plate 21 and is festooned over successive bars 20 and carried by the conveyor belt through the chamber 8 and then withdrawn over guide roll 25 and the conventionally shown "pull out" machine 26. The cloth is finally rolled up on the roller 27.

When the apparatus is in operation the festoons are formed between successive cross bars of the conveyor belt, the cloth being fed down over feed plate 21 between the cross bar in contact with the toes 22 of the plate 21 and the preceding cross bar. The cloth is in this manner kept out of contact with the rearward cross bar 20 during formation of the festoon. In Fig. 1 a half formed festoon is shown with a cross bar 20 in contact with the toes 22 of the plate 21 causing the plate 21 to move in a small arc to the right. The rate of travel of the conveyor belt and rate of feed of cloth 1 over plate 21 is adjusted so that as a festoon of the desired size is formed, the cross bar in contact with toes 22 of plate 21 passes so far to the right (Fig. 1) that the toes 22 ride up over that cross bar and the feed plate 21 swings back to the left until the toes 22 contact with the succeeding cross bar; formation of the next festoon commences at once. When the festoons reach the other end of the drying chamber, at which point the coated surface of the cloth is dry, the cloth is pulled out by the "pull out" machine 26 and rolled up on roller 27.

For the successful operation of this apparatus, it is necessary that the cloth will not slip with respect to the cross bars 20 until it is being pulled out by the "pull out" machine, at which point any unnecessary friction between the cloth and the cross bar should be avoided. For this reason each cross bar 20 is provided with a surface adapted to engage and hold the cloth on its upper forward face and is substantially smooth elsewhere.

Figure 4:
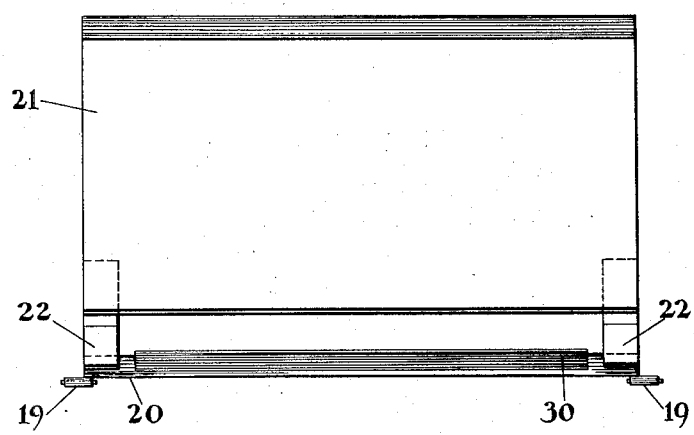
Fig. 4 is an elevation along the line 4—4 of Fig. 2.
Figure 3:
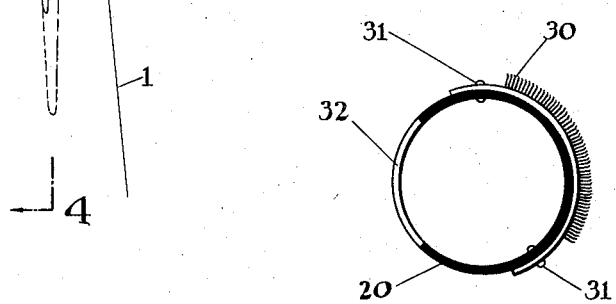
Fig. 3 is an enlarged transverse section of one of the cross bars of the conveyor belt shown in Fig. 1.

Referring to Figs. 3 and 4 particularly, each cross bar 20 comprises a tube, usually of steel, on which is mounted a strip of card cloth 30 held in position by pairs of rivets 31 adjacent each end, a hole 32 being provided in the cross bar 20 adjacent each end and on the opposite side from the card cloth to facilitate securing the rivets 31. As illustrated in Fig. 4, the card cloth 30 does not extend quite to either end of the cross bar 20. The purpose of this is to let the toes 22 ride on the cross bar 20 itself, rather than on the card cloth 30, which would be quickly worn out. By constructing the cross bars 20 in this manner, the car cloth 30 firmly holds the cloth while the festoons are being formed and carried through the drying chamber, and does not interfere when the cloth is being pulled out at the end of the drying chamber; the portion of cross bar 20 in contact with the cloth while it is being pulled out is smooth, thereby avoiding undue friction.

The above description is given to illustrate a specific embodiment of the invention, but the apparatus may be modified and varied widely without departing from the spirit of the invention.

This apparatus is automatic throughout, requires no lifting of cross bars from one conveyor belt to another and eliminates slipping of the cloth while forming in festoons and the resulting contact of the freshly coated surfaces of the cloth. It will be obvious that the present apparatus is materially more economical and less troublesome than the apparatus heretofore used for this purpose, both in eliminating manual labor and in eliminating the necessary halting of the machine in order to separate two coated surfaces of the cloth that had inadvertently come in contact with each other.

I claim:

1. In an apparatus for festooning cloth, the combination of a continuous conveyor belt adapted to travel substantially horizontally through a part of its course, said conveyor belt comprising a pair of spaced parallel flexible elements and spaced cross bars connecting said flexible elements, a strip of card cloth being disposed on the forward side of each of said cross bars intermediate, and not extending on either side to, said flexible elements, a feed plate pivoted at its upper end above said conveyor belt at a point where the travel of said belt is substantially horizontal, a pair of spaced toes mounted on said feed plate at its lower end and extending below the bottom of said feed plate, the position of the feed plate with respect to the conveyor belt being such that the cross bars of the conveyor belt on passing under the feed plate engage said spaced toes for a short period and swing the feed plate from a perpendicular position upward through a small arc in the direction of travel of the conveyor belt, said toes being spaced so as to engage the cross bars outside the strips of card cloth carried thereby, and means for feeding a web of cloth down over the feed plate and between an adjacent pair of cross bars of the conveyor belt to form a festoon while the rearward cross bar of said pair is in engagement with the feed plate, thereby preventing contact of the cloth with said rearward cross bar during formation of the festoon.

2. An apparatus for festooning cloth comprising a drying chamber, a continuous conveyor belt adapted to travel substantially horizontally through a part of its course disposed in said drying chamber, said conveyor belt comprising a pair of spaced parallel flexible elements and spaced cross bars connecting said flexible elements, a strip of card cloth being disposed on the forward side of each of said cross bars intermediate, and not extending on either side, to said flexible elements, a feed plate pivoted at its upper end above said conveyor belt at a point where the travel of said belt is substantially horizontal, a pair of spaced toes mounted on said feed plate at its lower end and extending below the bottom of said feed plate, the position of the feed plate with respect to the conveyor belt being such that the cross bars of the conveyor belt on passing under the feed plate engage said spaced toes for a short period and swing the feed plate from a perpendicular position upward through a small arc in the direction of travel of the conveyor belt, said toes being spaced so as to engage the cross bars outside the strips of card cloth carried thereby, and means for feeding a web of cloth down over the feed plate and between an adjacent pair of cross bars of the conveyor belt to form a festoon while the rearward cross bar of said pair is in engagement with the feed plate, thereby preventing contact of the cloth with said rearward cross bar during formation of the festoon.

3. In an apparatus for festooning cloth, the combination of a continuous conveyor belt adapted to travel substantially horizontally through a part of its course, said conveyor belt comprising a pair of spaced flexible elements and spaced cross bars connecting said flexible elements, a strip of card cloth being disposed on the forward side of each of said cross bars, means for feeding a web of cloth between adjacent cross bars and over the cross bars to form festoons of the cloth, and means for preventing contact of the cloth with the rearward one of adjacent cross bars while the festoon between said cross bars is being formed, said means being operated by engagement and disengagement of succeeding cross bars in their travel.

4. In an apparatus for festooning cloth, the combination of a continuous conveyor belt adapted to travel substantially horizontally through a part of its course, said conveyor belt comprising a pair of spaced flexible elements and spaced cross bars connecting said flexible elements, a strip of card cloth being disposed on the forward side of each of said cross bars, a feed plate pivoted at its upper end by the said conveyor belt at a point where the travel of said belt is substantially horizontal, the position of the feed plate with respect to the conveyor belt being such that the cross bars of the conveyor belt on passing under the feed plate engage same for a short period and swing the feed plate from a perpendicular position upward through a small arc in the direction of travel of the conveyor belt, and means for feeding a web of cloth down over the feed plate and between an adjacent pair of cross bars of the conveyor belt to form the festoon while the rearward cross bar of said pair is in engagement with the feed plate, thereby preventing contact of the cloth with said rearward cross bar during formation of the festoon.

5. In an apparatus for festooning cloth, the combination of a continuous conveyor belt adapted to travel substantially horizontally through a part of its course, said conveyor belt comprising a pair of spaced parallel flexible elements and spaced cross bars connecting said flexible elements, a strip of frictional material being disposed on the forward side of each of said cross bars intermediate, and not extending on either side to, said flexible elements, a feed plate pivoted at its upper end by the said conveyor belt at a point where the travel of said belt is substantially horizontal, a pair of spaced toes mounted on said feed plate at its lower end and extending below the bottom of said feed plate, the position of the feed plate with respect to the conveyor belt being such that the cross bars of the conveyor belt on passing under the feed plate engage said spaced toes for a short period and swing the feed plate from a perpendicular position upward through a small arc in the direction of travel of the conveyor belt, said toes being spaced so as to engage the cross bars outside the strips of frictional material carried thereby, and means for feeding a web of cloth down over the feed plate and between an adjacent pair of cross bars of the conveyor belt to form a festoon while the rearward cross bar of said pair is in engagement with the feed plate, thereby preventing contact of the cloth with said rearward cross bar during formation of the festoon.

EDGAR C. RICHARDSON.